(12) United States Patent
DeLange

(10) Patent No.: US 7,960,938 B2
(45) Date of Patent: Jun. 14, 2011

(54) METHOD AND APPARATUS FOR DETERMINING MOTOR ROTATION STATUS

(75) Inventor: Robert J. DeLange, Greenfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/018,753

(22) Filed: Dec. 21, 2004

(65) Prior Publication Data

US 2006/0132084 A1   Jun. 22, 2006

(51) Int. Cl.
*H02P 27/04* (2006.01)
(52) U.S. Cl. ............... 318/802; 318/400.35; 318/400.32
(58) Field of Classification Search .................. 318/802, 318/400.35, 400.32
See application file for complete search history.

(56) References Cited

U.S. PATENT DOCUMENTS

| | | | |
|---|---|---|---|
| 6,014,007 A | 1/2000 | Seibel et al. | |
| 6,242,885 B1* | 6/2001 | Ide et al. | 318/811 |
| 6,459,230 B1 | 10/2002 | Tao | |
| 6,861,813 B2* | 3/2005 | Yoshimoto et al. | 318/432 |
| 2004/0061461 A1* | 4/2004 | Tajima et al. | 318/254 |
| 2004/0100222 A1 | 5/2004 | Karikomi | |

* cited by examiner

*Primary Examiner* — Walter Benson
*Assistant Examiner* — Erick Glass
(74) *Attorney, Agent, or Firm* — Quarles & Brady LLP; Alexander R. Kuszewski; John M. Miller

(57) ABSTRACT

A motor drive unit includes a voltage inverter, a controller, and reconnect logic. The voltage inverter provides motor drive signals to an associated motor. The controller is operable to generate demand signals for at least two control axes for controlling the voltage inverter. The reconnect logic is operable to direct the controller to inject a current into a first control axis. The reconnect logic is further operable to monitor a voltage of a second control axis to detect zero crossings and determine a speed of the associated motor based on the detected zero crossings.

25 Claims, 5 Drawing Sheets

METHOD AND APPARATUS FOR DETERMINING MOTOR ROTATION STATUS

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to AC induction motor drives and, more particularly, to a method and apparatus for determining motor rotation status.

Induction motors have broad application in industry, particularly when large horsepower is needed. In a three-phase induction motor, three phase alternating voltages are impressed across three separate motor stator windings and cause three phase currents therein. Because of inductances, the three currents typically lag the voltages by some phase angle. The three currents produce a rotating magnetic stator field. A rotor contained within the stator field experiences an induced current (hence the term "induction") that generates a rotor field. The rotor field typically lags the stator field by some phase angle. The rotor field is attracted to the rotating stator field and the interaction between the two fields causes the rotor to rotate.

A common rotor design includes a "squirrel cage winding" in which axial conductive bars are connected at either end by shorting rings to form a generally cylindrical structure. The flux of the stator field cutting across the conductive bars induces cyclic current flows through the bars and across the shorting rings. The cyclic current flows in turn produce the rotor field. The use of this induced current to generate the rotor field eliminates the need for slip rings or brushes to provide power to the rotor, making the design relatively maintenance free.

To a first approximation, the torque and speed of an induction motor may be controlled by changing the frequency of the driving voltage, and thus, the angular rate of the rotating stator field. Generally, for a given torque, increasing the stator field rate will increase the speed of the rotor, which follows the stator field. Alternatively, for a given rotor speed, increasing the frequency of the stator field will increase the torque by increasing the slip (i.e., the difference in speed between the rotor and the stator fields). An increase in slip increases the rate at which flux lines are cut by the rotor, increasing the rotor generated field and thus the force or torque between the rotor and stator fields.

Referring to FIG. 1, a rotating phasor 10 corresponding to a stator magneto motive force ("mmf") generally has an angle, α, with respect to the phasor of rotor flux 12. The torque generated by the motor is proportional to the magnitudes of these phasors 10, 12 but is also a function of the angle, α. Maximum torque is produced when the phasors 10, 12 are at right angles to each other, whereas zero torque is produced if the phasors 10, 12 are aligned. The stator mmf phasor 12 may therefore be usefully decomposed into a torque producing component 14 perpendicular to rotor flux phasor 12 and a flux component 16 parallel to rotor flux phasor 12.

These two components 14, 16 of the stator mmf are proportional, respectively, to two stator current components: $i_q$, a torque producing current, and $i_d$, a flux producing current, which may be represented by quadrature or orthogonal vectors in a rotating or synchronous frame of reference (i.e., a reference frame that rotates along with the stator flux vector) and each vector $i_q$ and $i_d$ is characterized by slowly varying DC magnitude.

Accordingly, in controlling an induction motor, it is generally desired to control not only the frequency of the applied voltage, hence the speed of the rotation of the stator flux phasor 10, but also the phase of the applied voltage relative to the current flow, hence the division of the currents through the stator windings into the $i_q$ and $i_d$ components. Control strategies that attempt to independently control current components $i_q$ and $i_d$ are generally referred to as field oriented control strategies ("FOC").

There are many instances in which it is desirable to measure one or more parameters of motor operation. Typical parameters of interest include rotor speed, rotor direction, back EMF magnitude, and back EMF phase angle. During normal motor operation, adequate assumptions about these parameters can often be made based on the control that is implemented (e.g., if particular speed is commanded in an open loop control scheme, it is often adequate to assume that the control scheme is maintaining the actual motor speed at the commanded speed). However, situations exist in which such assumptions are not adequate. This is the case, for example, when a motor drive becomes disconnected from a motor (i.e., the power supply to the motor is interrupted, not necessarily the electrical connection between the motor drive and the motor) and open loop control is no longer present. In this case, with no control present, it is difficult to make any assumptions about the motor parameters.

There are a variety of reasons why a motor drive may become disconnected from a motor. For example, there may be a sudden temporary power loss at the power source that supplies power to the motor and motor drive. Alternatively, it may simply be the case that there are times when it is not necessary to operate the motor, and power is not supplied to the motor during these times.

The fact that the motor drive is disconnected from the motor does not prevent the motor from continuing to rotate. For example, if the motor is used in conjunction with a fan in an air conditioning system, a draft in the air conditioning system may drive the motor at an unknown speed and in an unknown direction. Similarly, if the motor is used in a conveyor system, the force of gravity acting on the motor by way of the conveyed articles and friction may drive the motor at an unknown speed and in an unknown direction.

When a motor drive becomes disconnected from a motor, it eventually becomes necessary to reconnect the motor drive to the motor. To perform the reconnection, it is desirable to determine the above-mentioned parameters, namely, rotor speed, rotor direction, back EMF magnitude and/or back EMF phase angle, before the motor drive is reconnected to the motor. Measuring these parameters is useful because it allows the motor drive to be synchronized to the motor, thereby reducing transients at the moment of reconnection. For example, if the speed of the motor is not determined before reconnection, then the motor drive must assume an initial speed of zero when reconnecting to the motor. This assumption may result in severe transients due to the difference between the frequency of the applied voltage and the frequency of the motor-induced back EMF. The transients are especially severe when the initial motor speed is high and when the motor is rotating in a reverse direction as compared to that commanded by the motor drive. If the current control circuitry or current limiting circuitry of the motor drive is not fast enough, the motor drive can fault due to an overcurrent condition. Additionally, when the motor operates as a generator (i.e., when the frequency of the voltage applied to the motor is less than the motor speed), the DC bus voltage may increase to unacceptable levels and cause damage to the power switches in the motor drive.

It is therefore desirable to determine motor parameters to allow the motor drive to be synchronized to the motor when the motor drive is reconnected and thereby to reduce transients upon reconnection. Additionally, when performing a reconnection, it is desirable to measure these parameters in as little time as possible so that operation may continue as smoothly as possible to make the temporary disconnection as imperceptible as possible.

One exemplary technique for measuring such motor parameters is described in U.S. Pat. No. 6,459,230, entitled "METHOD AND SYSTEM FOR MEASURING A PARAMETER OF MOTOR OPERATION," commonly assigned to the assignee of the present application, and incorporated herein by reference in its entirety.

The technique employed in the '230 patent attempts to determine if there is a back EMF on the motor that can be used to determine the motor's speed. The speed may be determined by regulating the current in the motor to zero and tracking the phase angle of the resulting voltages that it produces to counteract the back EMF. If it is determined there is no back EMF, an excitation sequence is applied to the motor to create a back EMF, which can then be used to determine the speed of the motor if it is rotating. The excitation sequence requires time to implement, thereby delaying the onset of acceleration and also creates an audible noise with some noticeable movement of the motor before acceleration starts. The larger the motor the longer the excitation sequence lasts.

In light of the delay and noise issues arising from using an excitation sequence to create back EMF and determine motor speed, it is desirable to determine motor speed and direction without requiring the excitation sequence, thereby providing a faster and more quiet reconnection.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

The present inventors have recognized that when a motor is not rotating or rotating at a low speed, the speed of the motor may be determined by commanding a current on one control axis, and monitoring zero crossings in the voltage of a different control axis. Determining the motor speed in this manner obviates the need for a more lengthy and noisier excitation process for determining speed.

One aspect of the present invention is seen in a motor drive unit including a voltage inverter, a controller, and reconnect logic. The voltage inverter provides motor drive signals to an associated motor. The controller is operable to generate demand signals for at least two control axes for controlling the voltage inverter. The reconnect logic is operable to direct the controller to inject a current into a first control axis. The reconnect logic is further operable to monitor a voltage of a second control axis to detect zero crossings and determine a speed of the associated motor based on the detected zero crossings.

Another aspect of the present invention is seen in a method for controlling a motor. The method includes injecting a current into a first control axis of a motor drive unit coupled to the motor. A voltage of a second control axis is monitored to detect zero crossings. A speed of the motor is determined based on the detected zero crossings.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL
VIEWS OF THE DRAWINGS

The invention will hereafter be described with reference to the accompanying drawings, wherein like reference numerals denote like elements, and:

Figure 1:
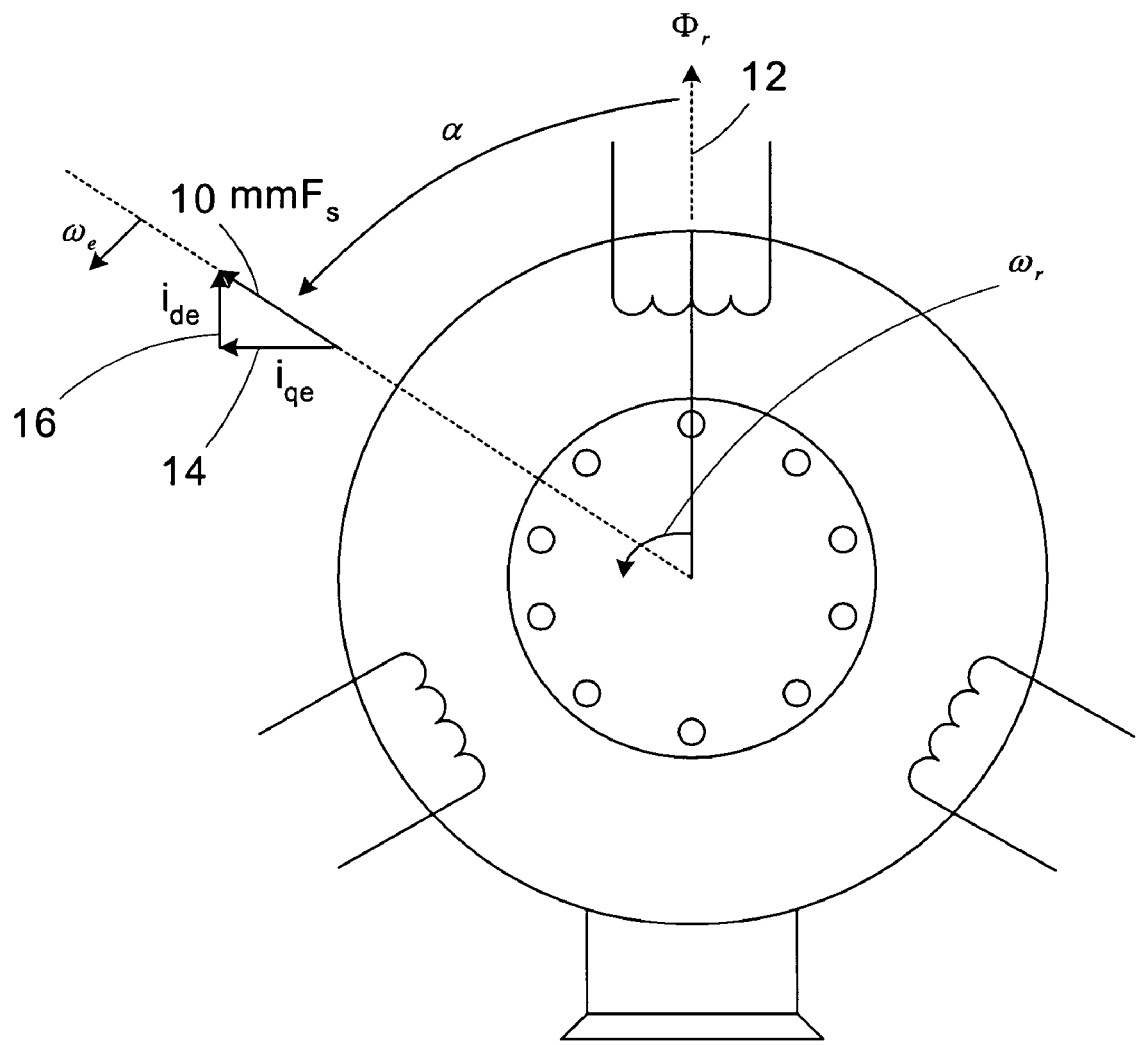
FIG. 1 is a schematic view in cross section of prior art induction motor system showing instantaneous locations of a rotor flux, a stator mmf, and the torque and flux components of the stator mmf.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 2:
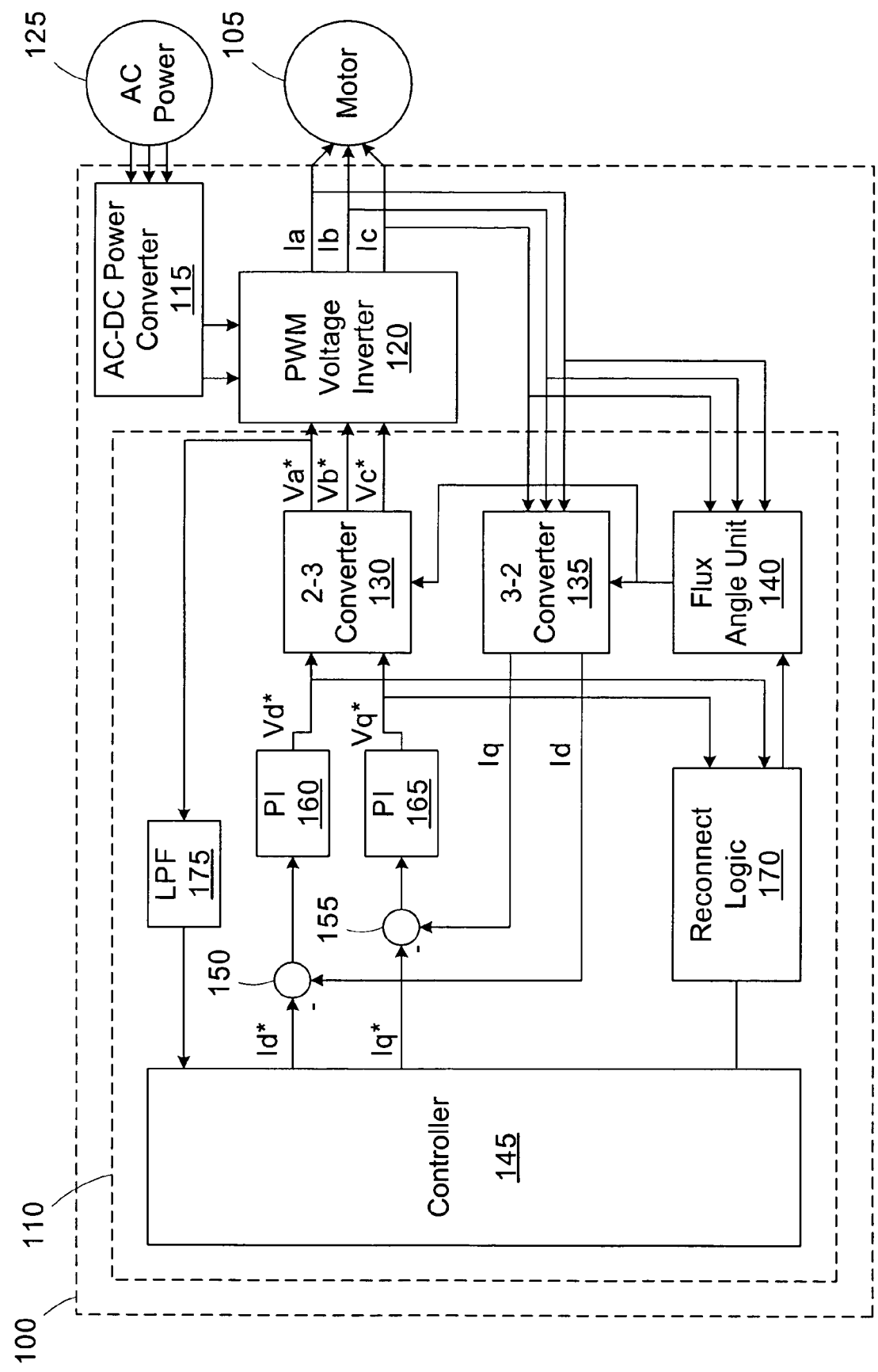
FIG. 2 is a block diagram of a motor drive unit capable of controlling a motor.

Referring now to the drawings wherein like reference numbers correspond to similar components throughout the several views and, specifically, referring to FIG. 2, the present invention shall be described in the context of a motor drive unit 100. The motor drive unit 100 drives an electric motor 105. The motor drive unit 100 includes a control system 110, an AC to DC power converter 115, and a PWM (Pulse Width Modulation) voltage inverter 120. The control system 110, the power converter 115 and the voltage inverter 120 cooperate to drive the motor 105 using power supplied by a three phase AC power source 125.

The control system 110 operates as an FOC system and regulates the current through the motor 105 by generating voltage commands Vq* and Vd* based on current commands Iq* and Id*. (Herein, lower case letters a, b and c denote phase A, phase B, and phase C, respectively, lower case letters q and d denote D phase and Q phase, respectively, and an asterisk denotes a "command" signal.) Of course, since current and voltage are directly related, the fact that current is controlled means that voltage is simultaneously also controlled, and vice versa.

The control system 110 includes a 2-3 phase converter 130 for converting the d and q phase voltage commands Vq* and Vd* to three phase voltage commands Va*, Vb* and Vc* for use by the voltage inverter 120. A complimentary 3-2 phase converter 135 is provided for converting the three phase motor feedback currents Ia, Ib, and Ic into d and q phase feedback currents, Iq and Id. A flux angle unit 140 is provided for determining the electrical flux angle, $\theta_e$, a necessary component of the transformation. Algorithms for determining the electrical flux angle and implementing the converting operations performed by the converters 130, 135 are well known in the FOC art and as such, are not described in greater detail herein.

The control system 110 is implemented in firmware executed by a microprocessor. The control system 110 includes a controller 145 which generates the current commands Iq* and Id*. During normal connected operation, the controller 145 generates the commands Iq* and Id* based on a speed command received at a user input (not illustrated).

The control system 110 includes two summers 150, 155 and two current regulators 160, 165 that form respective PI (proportional-integral) feedback control loops and which control the flow of actual motor currents Ia, Ib and Ic based on the current commands Id* and Iq*, respectively. Command currents Id* and Iq* are provided to the summers 150 and 155, respectively. The three phase motor currents, Ia, Ib, and Ic, are converted by the 2-3 phase converter 130 to two phase, feedback currents Id and Iq, respectively. The two phase feedback currents, Id and Iq, are provided to the summers 150 and 155, respectively. The summer 150 subtracts the d-axis feedback current Id from the d-axis command current Id* to generate a d-axis error signal, which is provided to the current regulator 160. Similarly, the summer 155 subtracts the q-axis feedback current Iq from the q-axis command current Iq* to generate an error signal, which is provided to the current regulator 165. The current regulators 160, 165 convert the current error signals to command voltage signals Vd* and Vq*, which are provided to the 2-3 phase converter 130. Current feedback signals for the 3-2 phase converter 135 are provided by current sensors associated with the motor 105.

The outputs of the 2-3 phase converter 130 are the voltage commands Va*, Vb* and Vc*. The voltage commands Va*, Vb* and Vc* are received by the PWM voltage inverter 120, which generates PWM control signals based on the voltage commands Va*, Vb* and Vc*. The PWM voltage inverter 120 includes a network of six solid state switches (not illustrated) which are switched on and off in accordance with the PWM control signals. The solid state switches convert the low power PWM control signals to high power current pulses to drive the motor 105 using power supplied by the three-phase AC source 125 via the AC-DC power converter 115. The PWM voltage inverter 120 also includes a conventional PWM dead time compensation circuit (not illustrated) to compensate for the dead time necessary between PWM pulses to prevent short circuiting the power supply.

The control system 110 also includes reconnect logic 170. The reconnect logic 170 is a system which receives the voltage commands Vd* and Vq* from the current regulators 165, 170 and performs calculations to determine the back EMF frequency (and thereby the rotor speed), rotor direction, back EMF magnitude, and back EMF phase angle. During a reconnect proves, the reconnect logic 170, the controller 145, and the current regulators 165, 170 cooperate to reconnect the motor drive unit 110 to the motor 105. Additionally, during the reconnect process, the voltage command Va* provides voltage feedback that may be used to establish a positive feedback control loop. In FIG. 2, the voltage command Va* passes through a low pass filter 175 to reduce ripple voltage.

Figure 3:
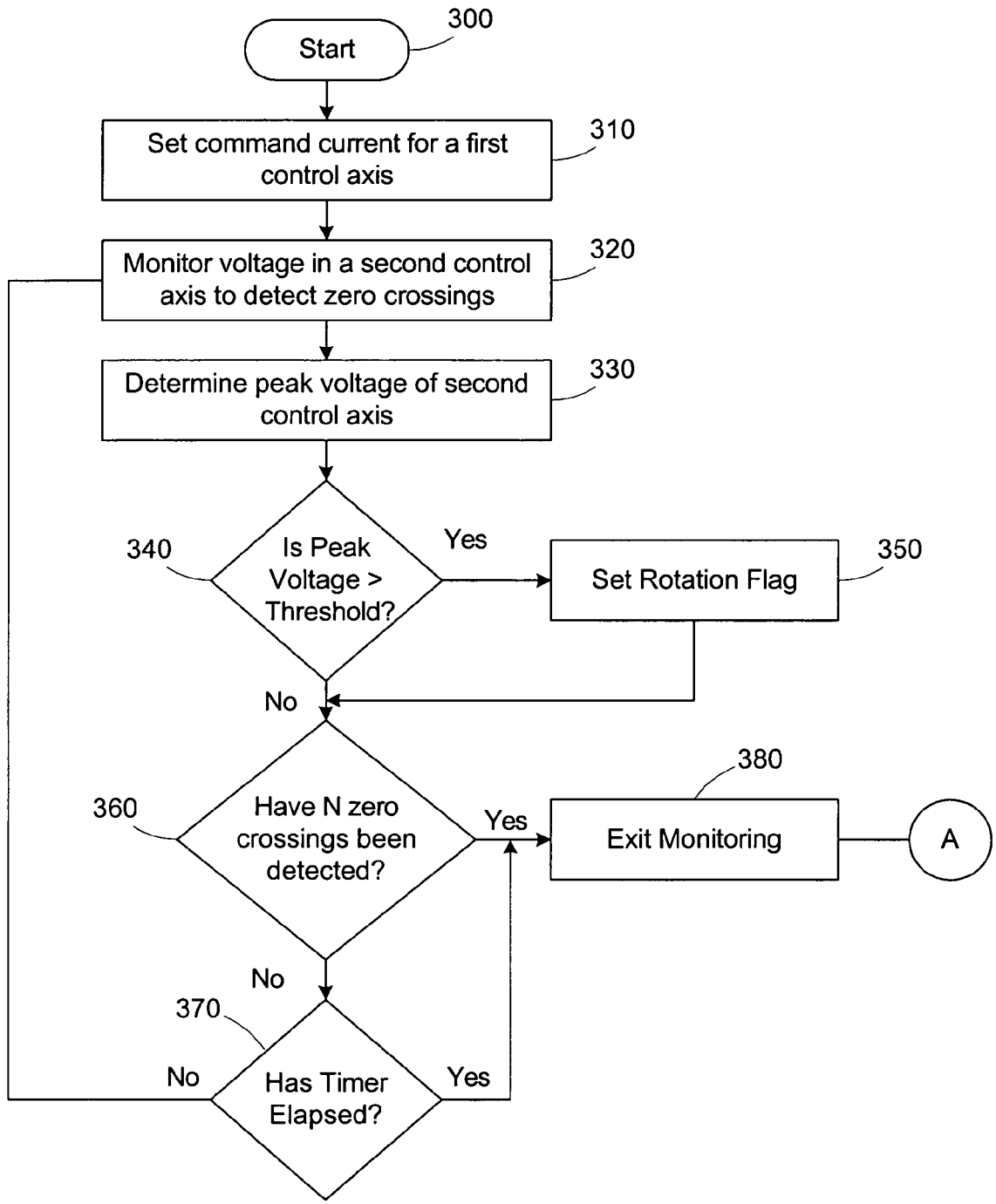
FIGS. 3 and 4 are simplified flow diagrams of a method for reconnecting a motor to a motor drive unit.
Figure 4:
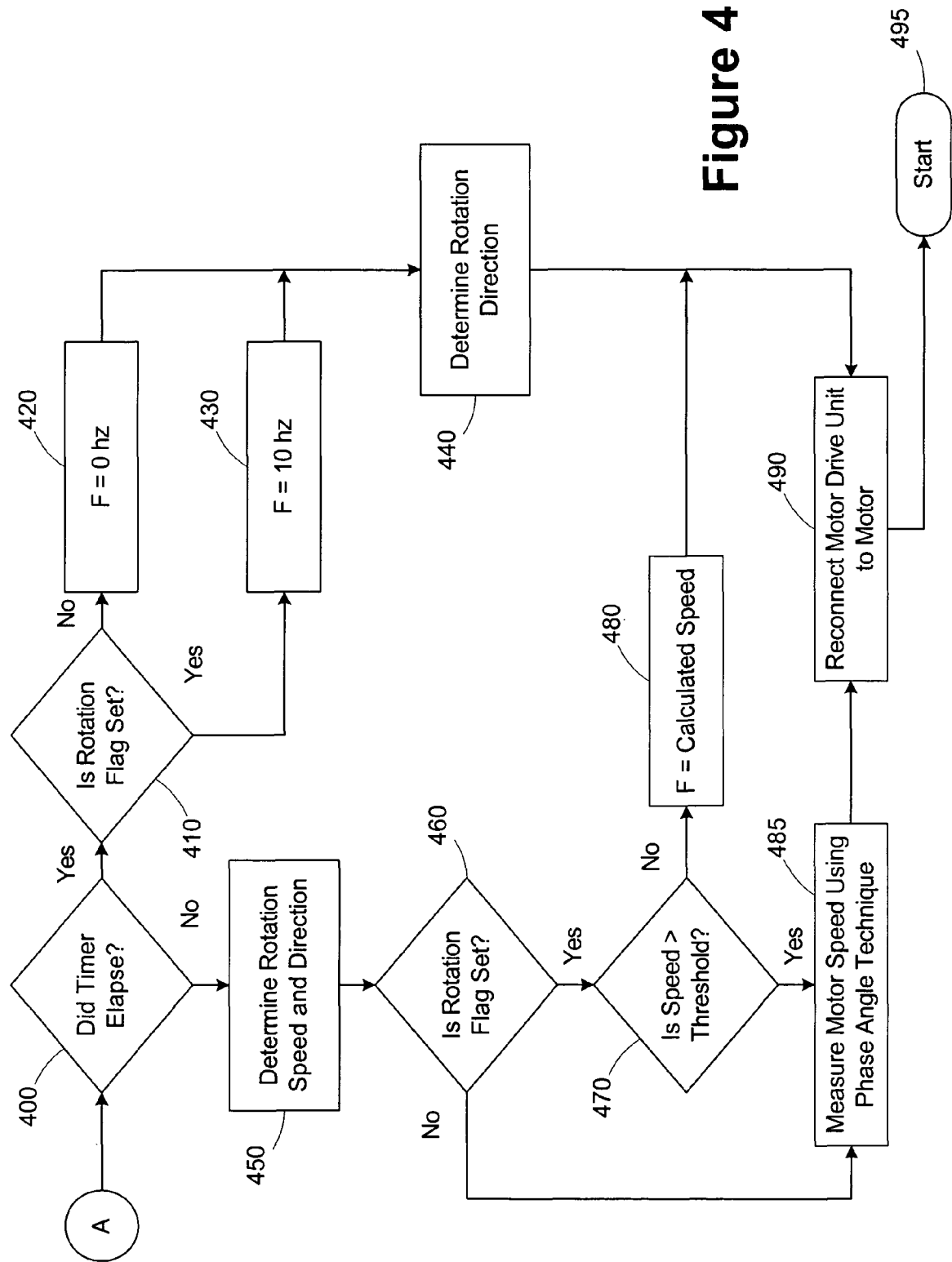

Referring now to FIGS. 3 and 4, a flowchart describing the operation of the motor drive unit 110 to reconnect to the motor 105 is illustrated. In general, the reconnection technique involves commanding a current on one of the control axes (i.e., d or q). The voltage present on the other axis is monitored for a predetermined time period to detect zero crossings. When the motor is rotating, the axis voltage is sinusoidal with an average value of zero and a measurable amplitude. The voltage of the same axis as the current behaves similarly but has a dc offset due to the current in that axis, so it is more difficult to measure the zero crossings. If the monitoring indicates that the motor is stopped or rotating below a predetermined speed, the determined speed is used to reconnect the motor without requiring an excitation sequence, resulting in a quicker and more quiet reconnection. If the motor is rotating at a speed above the threshold, a back EMF speed determination technique, such as that described in the '230 patent referenced above, is used to derive motor speed based on the measured voltage phase angle.

Starting with FIG. 3, the reconnection sequence initiates in block 300. A timer is used to set a predetermined time interval (e.g., 100 msec) in which to monitor the motor voltages to determine speed. In block 310 the command current, Id* or Iq*, of a first control axis is set to a predetermined level (e.g., 1% of rated current). In block 320, the voltage feedback signal, Vd or Vq, for a second control axis is monitored to detect zero crossings. In the illustrated embodiment, if the command current is set for the d-axis, the q-axis voltage is monitored. Similarly, if the command current is set for the q-axis, the d-axis voltage is measured. It is possible to measure the voltage in the same control axis for which the command current is set, but zero crossing detection is made more difficult due to the DC offset created by the command current. The predetermined level for the command current is established at a relatively low value so that the response of the other axis can be measured, but not at such a level that it induces a significant field in the motor.

Figure 5:
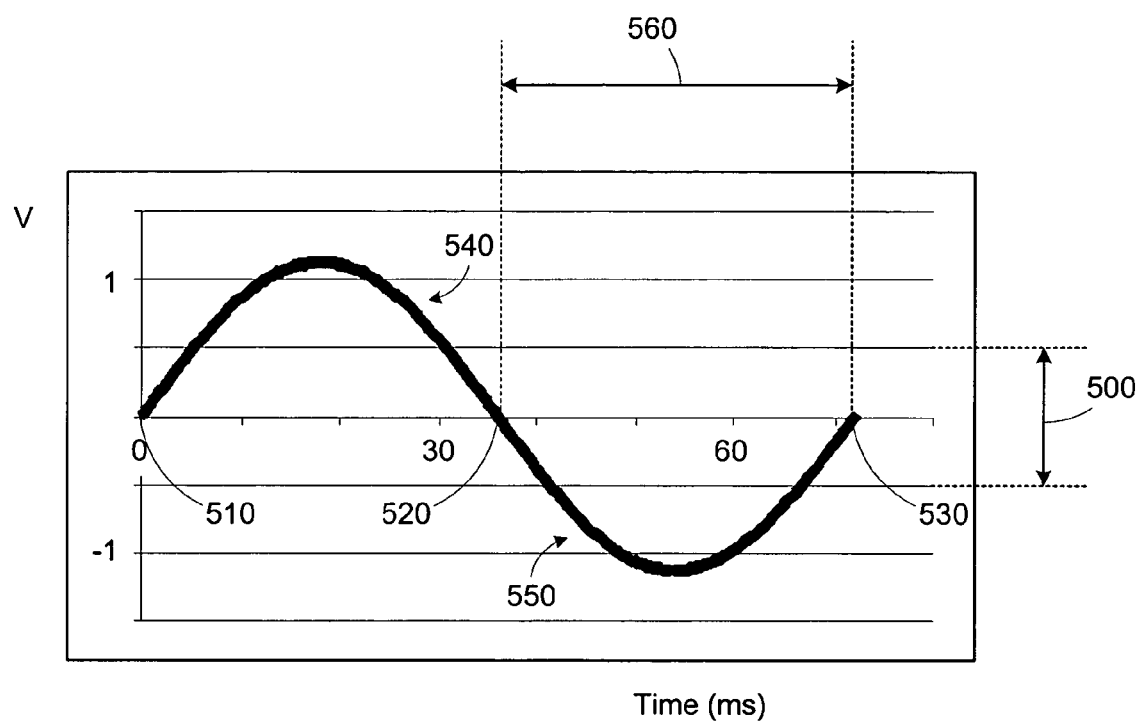
FIG. 5 is an exemplary curve of the voltage measured in a monitored control axis to determine motor speed.

FIG. 5 illustrates an exemplary curve of the voltage measured in the monitored control axis. In the illustrated embodiment, a detection window 500 of +0.5V to −0.5V is employed to define a zero crossing. Of course other detection windows may be used. Moreover, other techniques may be used that do not directly measure zero crossings, but rather infer zero crossings from other parameters. As used herein, detecting zero crossings may relate to directly measuring zero crossings or inferring zero crossings from other data. In FIG. 5, three zero crossings 510, 520, 530 are illustrated.

In block 330, the peak voltage of the second control axis is determined. Although not illustrated by the flow diagram in FIG. 3, in the illustrated embodiment the peak voltage is determined between the second and third measured zero crossings 510, 520 (shown in FIG. 5). If the peak voltage is greater than a predetermined threshold (e.g., 1.0V) in block 340, a rotation flag is set in block 350. If less than two zero crossings are detected, the peak voltage is not determined, and the rotation flag is not set. The minimum peak voltage threshold is evaluated to ensure the validity of the zero crossing detections.

In block 360, the number of detected zero crossings are compared to a predetermined threshold, N (e.g., 3). If the required number of zero crossing has not been detected, the timer is checked in block 370. If the timer (e.g., 100 ms) has not elapsed, the monitoring of the voltage in the second control axis continues in block 320. If either N zero crossings are detected in block 360 or the timer elapses in block 370, the monitoring operation is terminated in block 380, and the method transitions to the marker "A" and continues in FIG. 4.

As seen in FIG. 4, the reconnect logic 170 takes different actions depending on what occurred during the monitoring phase. If the timer elapsed in block 400 (i.e., 100 ms passed without detecting an Nth zero crossing) and the rotation flag is not set in block 410, the motor speed is set to 0 Hz in block 420 (i.e., the motor is not rotating). If the rotation flag is set in block 410, the motor speed is set to 10 Hz in block 440. The value of 10 Hz is selected as a compromise value. Because the rotation flag was set, it is known that the motor 105 is rotating, however, because the timer elapsed without receiving the third zero crossing, the motor speed is relatively low. The value of 10 Hz may vary depending on the particular implementation and characteristics of the motor 105.

In block 440, the motor direction is determined. In the illustrated embodiment, the motor direction is determined by comparing the slope of the voltage curve for the commanded control axis (i.e., the q-axis in the illustrative example) to the sign of the peak voltage measured in block 330 of FIG. 3 for the monitored control axis (i.e., the d-axis). If the signs of the slope and peak voltage match (i.e., both positive or both negative), the motor 105 is rotating in the reverse direction. If the signs do not match, the motor 105 is rotating in the forward direction. In the illustrated embodiment, the motor direction is checked during the half cycles before and after the second zero crossing, as indicated by points 540 and 550 in FIG. 5, however, the direction measured during the second half cycle at point 550 is given precedence.

If the timer did not elapse in block 400, at least three zero crossings were identified during the monitor interval, and the monitoring was terminated. In block 450, the motor direction and speed are determined. The motor direction is determined as described above in block 440. The motor speed is determined based on the time elapsed between the second and third zero crossings, as indicated by the interval 560 shown in FIG. 5. The time elapsed is converted to a motor frequency based on the known characteristics of the motor 105.

If the rotation flag is set in block 460, the speed calculated in block 440 is checked to determine if it exceeds a predetermined speed threshold (e.g., 26 Hz in the illustrated embodiment. If the calculated speed is less than the threshold, the motor speed is set to the calculated speed in block 480.

In some cases it may be less effective to use the zero crossing technique to determine the motor speed. For example, if the rotation flag was not set in block 460, but N zero crossings were detected, the zero crossing detections may not be valid. Also, if the motor is rotating at a higher speed (e.g., over the 26 Hz threshold) the phase angle technique may yield a more precise measurement of motor speed. Hence, if the rotation flag is not set in block 460 or the calculated speed exceeds the predetermined speed threshold in block 470, the conventional excitation technique that measures phase angle and excites the motor 150, if necessary, is used to determine the motor speed in block 485.

In block 490, the motor drive unit 100 is reconnected to the motor 105 based on the motor speed determined in one of blocks 420, 430, 480, or 485. Techniques for reconnecting the motor drive unit 100 to the motor 105 are well known in the art, once the motor speed has been determined, and as such, they are not described in greater detail herein. The reconnection sequence terminates in block 495.

The techniques described above allow a motor at rest or rotating at a slow speed to be reconnected without requiring an excitation sequence. As such, the reconnection may be implemented more quickly and more quietly.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A motor drive unit, comprising:
a voltage inverter for providing motor drive signals to an associated motor;
a controller operable to control the voltage inverter;
reconnect logic operable to direct the controller to generate a signal, the signal operable to control the flow of a current on a first control axis, the reconnect logic being further operable to monitor a voltage of a second control axis to detect zero crossings and determine when the motor is at rest based on the detected zero crossings; and
wherein the reconnect logic is further operable to terminate the monitoring responsive to the detection of a predetermined number of zero crossings.

2. The motor drive unit of claim 1, wherein the reconnect logic is further operable to determine a speed associated with the motor and to reconnect the motor to the motor drive unit based on the determined speed.

3. The motor drive unit of claim 1, wherein the reconnect logic is further operable to monitor the voltage for a predetermined time interval and terminate the monitoring responsive to the predetermined time interval elapsing prior to the detection of the predetermined number of zero crossings.

4. The motor drive unit of claim 3, wherein the reconnect logic is further operable to determine a speed associated with the motor and a peak voltage of the second control axis and set the determined speed to a predetermined value responsive to the peak voltage being greater than a predetermined threshold and the time interval elapsing prior to the detection of the predetermined number of zero crossings.

5. The motor drive unit of claim 1, wherein the reconnect logic is further operable to determine a speed associated with the motor and a peak voltage of the second control axis and disregard the determined speed responsive to the peak voltage being less than a predetermined threshold.

6. The motor drive unit of claim 5, wherein the reconnect logic is further operable to set the motor speed to zero responsive to the peak voltage being less than the predetermined threshold.

7. The motor drive unit of claim 1, wherein the reconnect logic is further operable to determine a speed associated with the motor based on the time interval between zero crossings.

8. The motor drive unit of claim 1, wherein the reconnect logic is further operable to determine a speed associated with the motor and disregard the determined motor speed responsive to the predetermined motor speed exceeding a predetermined threshold.

9. The motor drive unit of claim 1, wherein the first control axis and the second control axis are the same control axis.

10. A motor drive unit, comprising:
a voltage inverter for providing motor drive signals to an associated motor;
a controller operable to control the voltage inverter;
reconnect logic operable to direct the controller to generate a signal, the signal operable to control the flow of a current on a first control axis, the reconnect logic being further operable to monitor a voltage of a second control axis to detect zero crossings and determine when the motor is at rest based on the detected zero crossings; and
wherein the reconnect logic is further operable to determine a slope of a voltage curve for the first control axis, determine a peak voltage of the second control axis, and compare a sign of the peak voltage to the slope to determine a motor direction.

11. A motor drive unit, comprising:
a voltage inverter for providing motor drive signals to an associated motor;
a controller operable to control the voltage inverter;
reconnect logic operable to direct the controller to generate a signal, the signal operable to control the flow of a current on a first control axis, the reconnect logic being further operable to monitor a voltage of a second control axis to detect zero crossings and determine when the motor is at rest based on the detected zero crossings; and
wherein the first control axis comprises one of a d-axis and a q-axis, and the second control axis comprises the other of the d-axis and the q-axis.

12. A method for controlling a motor, comprising:
controlling the flow of a current on a first control axis of a motor drive unit coupled to the motor;
monitoring a voltage of a second control axis to detect zero crossings;
determining whether the motor is at rest based on the detected zero crossings;
if the motor is not at rest, determining a speed of the motor based on the detected zero crossings; and
terminating the monitoring responsive to the detection of a predetermined number of zero crossings.

13. The method of claim 12, further comprising reconnecting the motor to the motor drive unit based on the determined speed.

14. The method of claim 12, wherein monitoring the voltage further comprises:
monitoring the voltage for a predetermined time interval; and
terminating the monitoring responsive to the predetermined time interval elapsing prior to the detection of the predetermined number of zero crossings.

15. The method of claim 14, further comprising:
determining a peak voltage of the second control axis; and
setting the determined speed to a predetermined value responsive to the peak voltage being greater than a predetermined threshold and the time interval elapsing prior to the detection of the predetermined number of zero crossings.

16. The method of claim 12, further comprising:
determining a peak voltage of the second control axis; and
disregarding the determined speed responsive to the peak voltage being less than a predetermined threshold.

17. The method of claim 16, further comprising setting the motor speed to zero responsive to the peak voltage being less than the predetermined threshold.

18. The method of claim 12, further comprising determining the motor speed based on the time interval between zero crossings.

19. The method of claim 12, further comprising disregarding the determined motor speed responsive to the predetermined motor speed exceeding a predetermined threshold.

20. The method of claim 12, wherein the first control axis and the second control axis the same control axis.

21. A method for controlling a motor, comprising:
controlling the flow of a current on a first control axis of a motor drive unit coupled to the motor;
monitoring a voltage of a second control axis to detect zero crossings;
determining whether the motor is at rest based on the detected zero crossings;
if the motor is not at rest, determining a speed of the motor based on the detected zero crossings;
determining a slope of a voltage curve for the first control axis;
determining a peak voltage of the second control axis; and
comparing a sign of the peak voltage to the slope to determine a motor direction.

22. A method for controlling a motor, comprising:
controlling the flow of a current on a first control axis of a motor drive unit coupled to the motor;
monitoring a voltage of a second control axis to detect zero crossings;
determining whether the motor is at rest based on the detected zero crossings;
if the motor is not at rest, determining a speed of the motor based on the detected zero crossings; and
wherein the first control axis comprises one of a d-axis and a q-axis, and the second control axis comprises the other of the d-axis and the q-axis.

23. A motor drive unit, comprising:
a voltage inverter for providing motor drive signals to an associated motor;
a controller operable to control the voltage inverter and to generate a signal, the signal operable to control the flow of a current on a first control axis;
reconnect logic operable to monitor a voltage of a second control axis to detect zero crossings and determine a speed of the associated motor based on the detected zero crossings; and
wherein the reconnect logic is further operable to terminate the monitoring responsive to the detection of a predetermined number of zero crossings.

24. A motor drive unit, comprising:
a voltage inverter for providing motor drive signals to an associated motor;
a controller operable to control the voltage inverter;
reconnect logic operable to direct the controller to generate a signal operable to control the flow of a current on a first control axis, the reconnect logic being further operable to monitor a voltage of a second control axis to detect zero crossings and determine a speed of the associated motor based on the detected zero crossings; and wherein the reconnect logic is further operable to determine a slope of a voltage curve for the first control axis, determine a peak voltage of the second control axis, and compare a sign of the peak voltage to the slope to determine a motor direction.

25. A motor drive unit, comprising:
a voltage inverter for providing motor drive signals to an associated motor;
a controller operable to control the voltage inverter;
reconnect logic operable to direct the controller to generate a signal, the signal operable to control the flow of a current on a first control axis, the reconnect logic being further operable to monitor a voltage of a second control axis to detect zero crossings and determine a speed of the associated motor based on the detected zero crossings; and
wherein the first control axis comprises one of a d-axis and a q-axis, and the second control axis comprises the other of the d-axis and the q-axis.

* * * * *